(12) United States Patent
Taguchi

(10) Patent No.: US 6,681,583 B2
(45) Date of Patent: Jan. 27, 2004

(54) CONTROL UNIT FOR CLUTCHLESS, VARIABLE DISPLACEMENT COMPRESSOR

(75) Inventor: Yukihiko Taguchi, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/300,803

(22) Filed: Nov. 21, 2002

(65) Prior Publication Data
US 2003/0097849 A1 May 29, 2003

(30) Foreign Application Priority Data
Nov. 29, 2001 (JP) ............................ P2001-364380

(51) Int. Cl.⁷ ............................. B60H 1/32; F25B 1/00; F25B 49/00
(52) U.S. Cl. ........................................ 62/133; 62/228.5
(58) Field of Search ............................... 62/133, 228.5, 62/228.1, 157, 193

(56) References Cited

U.S. PATENT DOCUMENTS

| 5,678,761 | A | 10/1997 | Ikeda |
| 5,765,383 | A | 6/1998 | Inoue |
| 5,816,066 | A | 10/1998 | Aoki et al. |
| 5,934,172 | A | 8/1999 | Terauchi |
| 5,988,515 | A | 11/1999 | Funakoshi et al. |
| 5,992,156 | A | 11/1999 | Isobe et al. |
| 6,016,966 | A | 1/2000 | Inoue |
| 6,042,016 | A | 3/2000 | Ikeda |
| 6,341,494 | B1 | 1/2002 | Isobe et al. |
| 2002/0108384 | A1 | 8/2002 | Higashiyama |
| 2002/0152763 | A1 * | 10/2002 | Murase et al. ............. 62/323.1 |
| 2003/0084674 | A1 * | 5/2003 | Kawaguchi et al. ....... 62/228.5 |

FOREIGN PATENT DOCUMENTS

JP 11-159449 6/1999

* cited by examiner

Primary Examiner—Marc Norman
(74) Attorney, Agent, or Firm—Baker Botts L.L.P.

(57) ABSTRACT

A control unit for a clutchless variable displacement compressor with a solenoid is used in an air conditioning system for vehicles. The control unit includes a solenoid drive for adjusting a current flowing in the solenoid, a voltmeter for detecting a voltage applied to the solenoid, an ammeter for detecting the current of the solenoid, and a control for supplying current to the solenoid drive during a first predetermined time period when the air conditioning system is not in operation, and current has been prevented from flowing to the solenoid during a second predetermined time period. A resistance of a coil of the solenoid is calculated from the detected voltage and the detected current. A temperature of the compressor is determined from the calculated resistance based on a predetermined relationship between the resistance and the temperature of the coil of the solenoid when the air conditioning system is not in operation; the compressor is operated by supplying current to the solenoid when the calculated temperature exceeds a set value. Thus, the temperature of the compressor may be detected by a control mechanism, and the compressor may be protected against an excessive increase of temperature.

8 Claims, 7 Drawing Sheets

CONTROL UNIT FOR CLUTCHLESS, VARIABLE DISPLACEMENT COMPRESSOR

BACKGROUND OF THE INVENTION

1. Field of the Invention

The present invention relates to a control unit for a clutchless, variable displacement compressor used in air conditioning systems for vehicles and operated in response to an external signal.

2. Description of Related Art

In known variable displacement compressors used in conventional air conditioning systems for vehicles, a temperature of the compressor, such as a temperature of a housing, may be elevated by operation of the compressor to an excessive level. When detected by a thermistor, such an excessive increase of the temperature of the compressor may be prevented, for example, as described in Japanese Patent Application No. JP-A-11-159449.

In such known systems, a degree of protection of the compressor may be achieved when the temperature of the compressor increases while the air conditioning system is in operation. Nevertheless, such clutchless, variable displacement compressors are generally driven integrally with an engine. Thus, the compressors are rotated at a condition of minimum displacement of discharge together with the engine, even when the air conditioning system is not in operation, and such known systems are unable to protect the compressors from damage. In particular, because little or no refrigerant is circulated in this condition of minimum displacement of discharge, lubrication in the compressor may be insufficient. If the rotational speed is increased markedly under such conditions, the temperature of the compressor may increase excessively. If such a condition persists, the reliability of the compressor may diminish, and the compressor may be damaged.

SUMMARY OF THE INVENTION

A need has arisen for preventing a persistent increase in the temperature of the compressor. Accordingly, it is an object of the present invention to provide a control unit for a variable displacement compressor, particularly for a clutchless, variable displacement compressor, which protects the compressor against a persistent increase in the temperature of the compressor by detecting an increase of the temperature of the compressor, when the compressor is driven at its minimum displacement. Such a control unit does not require a temperature sensor such as a thermistor, yet prevents the occurrence of an excessive increase of temperature.

To achieve the foregoing and other objects, a control unit for a variable displacement compressor according to the present invention is provided. The control unit for a clutchless variable displacement compressor is used in an air conditioning system for vehicles, and the compressor is equipped with a solenoid. The discharge displacement of the compressor is controlled by varying a pressure in the compressor by a control valve adjusted in response to a current flowing in the solenoid. The control unit comprises solenoid drive means which comprises switching elements for adjusting the current flowing in the solenoid; voltage detection means, e.g., a voltmeter, for detecting a voltage applied to the solenoid; current detection means for detecting the current flowing in the solenoid; and control means for delivering current to the solenoid drive means during a first predetermined time period in which the air conditioning system for vehicles is not in operation and during which current has been prevented from flowing to the solenoid continuously during a second predetermined time period. A resistance of a coil of the solenoid is calculated from a voltage detected by the voltage detection means and a current detected by the current detection means. A temperature of the compressor is determined from the calculated resistance based on a predetermined relationship between the resistance and the temperature of the coil of the solenoid. The air conditioning system for vehicles begins operation and operation of the variable displacement compressor are terminated by supplying current to the solenoid when the determined temperature exceeds a set value.

The control unit for a variable displacement compressor may be structured as described below. Specifically, the control unit may comprise rotational speed detection means, e.g., a tachometer, for detecting a physical value corresponding to a rotational speed of the compressor. In the control unit, the control means controls the supply of current to the solenoid drive means during the first predetermined time period in which the air conditioning system for vehicles is not in operation. Current has been prevented from flowing to the solenoid during the second predetermined time period, and an output value of the rotational speed detection means exceeds a predetermined value continuously over a third predetermined time period. The resistance of the coil of the solenoid is calculated from a voltage detected by the voltage detection means and a current detected by the current detection means, such as by a voltmeter in combination with an ammeter or by a voltammeter. A temperature of the compressor is determined from the calculated resistance based on the predetermined relationship between the resistance and the temperature of the coil of the solenoid. When the air conditioning system for the vehicle begins operation, the variable displacement compressor operates to supply current to the solenoid when the calculated temperature exceeds the set value.

In another embodiment, the control unit for a variable displacement compressor may be structured as described below. Specifically, the control unit may comprise thermal load detection means for detecting a thermal load, such as an outside air temperature, and in the control unit, the control means controls the supply of current flowing to the solenoid drive means during the first predetermined time period, when the air conditioning system for vehicles is not in operation. Current has been prevented from flowing to the solenoid during the second predetermined time period, and an output value of the thermal load detection means exceeds a predetermined value continuously during a fourth predetermined time period. The a resistance of the coil of the solenoid is calculated from a voltage detected by the voltage detection means and a current detected by the current detection means. A temperature of the compressor is determined from the calculated resistance based on the predetermined relationship between the resistance and the temperature of the coil of the solenoid. When the air conditioning system for vehicles begins operation, the variable displacement compressor operates to supply current to the solenoid when the calculated temperature exceeds the set value.

In still another embodiment, the embodiment control unit for a variable displacement compressor may be structured as described below. Specifically, the control unit may comprise thermal load detection means for detecting a thermal load, such as an outside air temperature, and rotational speed detection means for detecting a physical value corresponding to a rotational speed of the compressor. In the control unit, the control means controls supply of current flowing to the solenoid drive means during the first predetermined time period, when the air conditioning system for vehicles is not in operation. Current has been prevented from flowing to the solenoid during the second predetermined time period, and output values for each of the thermal load detection means and the rotational speed detection means have exceeded respective predetermined values continuously during a fifth predetermined time period. The resistance of the coil of the solenoid is calculated from a voltage detected by the voltage detection means and a current detected by the current detection means at that time. A temperature of the compressor is determined from the calculated resistance based on the predetermined relationship between a resistance and a temperature of the coil of the solenoid. When the air conditioning system for vehicles begins operation, the variable displacement compressor operates to supply current to the solenoid when the calculated temperature exceeds the set value.

Moreover, the above-described control means may be constructed so as to cease operation of the air conditioning system for vehicles after a sixth predetermined time period.

In such a control unit for a variable displacement compressor according to the present invention, when the air conditioning system for vehicles is not in operation and the variable displacement compressor has been driven during the second predetermined time period in a minimum displacement condition (i.e., without current being supplied to the solenoid). The solenoid drive means intentionally is provided with current during the first predetermined time and the solenoid is supplied with current. At that time, because the voltage applied across the solenoid and the current flowing in the solenoid are detected by the voltage detection means and the current detection means. From these detected voltage and current values, the resistance value of the coil of the solenoid at a particular time may be calculated. By predetermining a relationship between a resistance and a temperature of the coil of the solenoid in advance the temperature of the compressor may be determined from the calculated resistance based on the predetermined relationship. When the calculated temperature of the compressor exceeds a preset value, the air conditioning system for vehicles may begin operation, and the solenoid is supplied with current. The variable displacement compressor is operated, and refrigerant is circulated intentionally, whereby the compressor is cooled and the inside of the compressor is lubricated. Consequently, the increase of the temperature of the compressor may be suppressed, a smooth operation of the compressor may be ensured by the sufficient lubrication, the occurrence of an abnormal operating conditions may be prevented, and the compressor may be protected. Operation of the air conditioning system then may again cease after the reduction of the compressor temperature and the lubrication of the compressor interior.

Thus, in the control unit for a clutchless, variable displacement compressor according to the present invention, the temperature of the variable displacement compressor may be properly estimated when the air conditioning system is not in operation. This may be accomplished without the use of a temperature sensor. When the air conditioning system is not in operation for a predetermined period of time and the temperature of the compressor rises to an excessively high temperature, the state of the air conditioning system is turned to be in operation, and the compressor is cooled and any lack of lubrication is resolved. Thus, damage to the compressor may be prevented or reduced, and the compressor may be appropriately protected.

Further, because the detection of the voltage across and of the current flowing through the solenoid may be restricted to occur under a limited set of conditions (e.g., an outside air temperature or a rotational speed of the compressor or an outside air temperature plus a rotational speed of the compressor), the normal operation of the air conditioning system may not be much disturbed. Moreover, because the time for operating the air conditioning system is limited, the operation of the air conditioning system also may not be much disturbed.

In addition, when determining factors, such as engine rotational speed and outside air temperature, are factored into the control of the compressor, the temperature of the compressor may be estimated more accurately.

Further objects, features, and advantages of the present invention will be understood from the following detailed description of preferred embodiments of the present invention with reference to the accompanying figures.

BRIEF DESCRIPTION OF THE DRAWINGS

Embodiments of the invention are now described with reference to the accompanying figures, which are given by way of example only, and are not intended to limit the disclosure of the present invention.

DETAILED DESCRIPTION OF PREFERRED EMBODIMENTS

Figure 1:
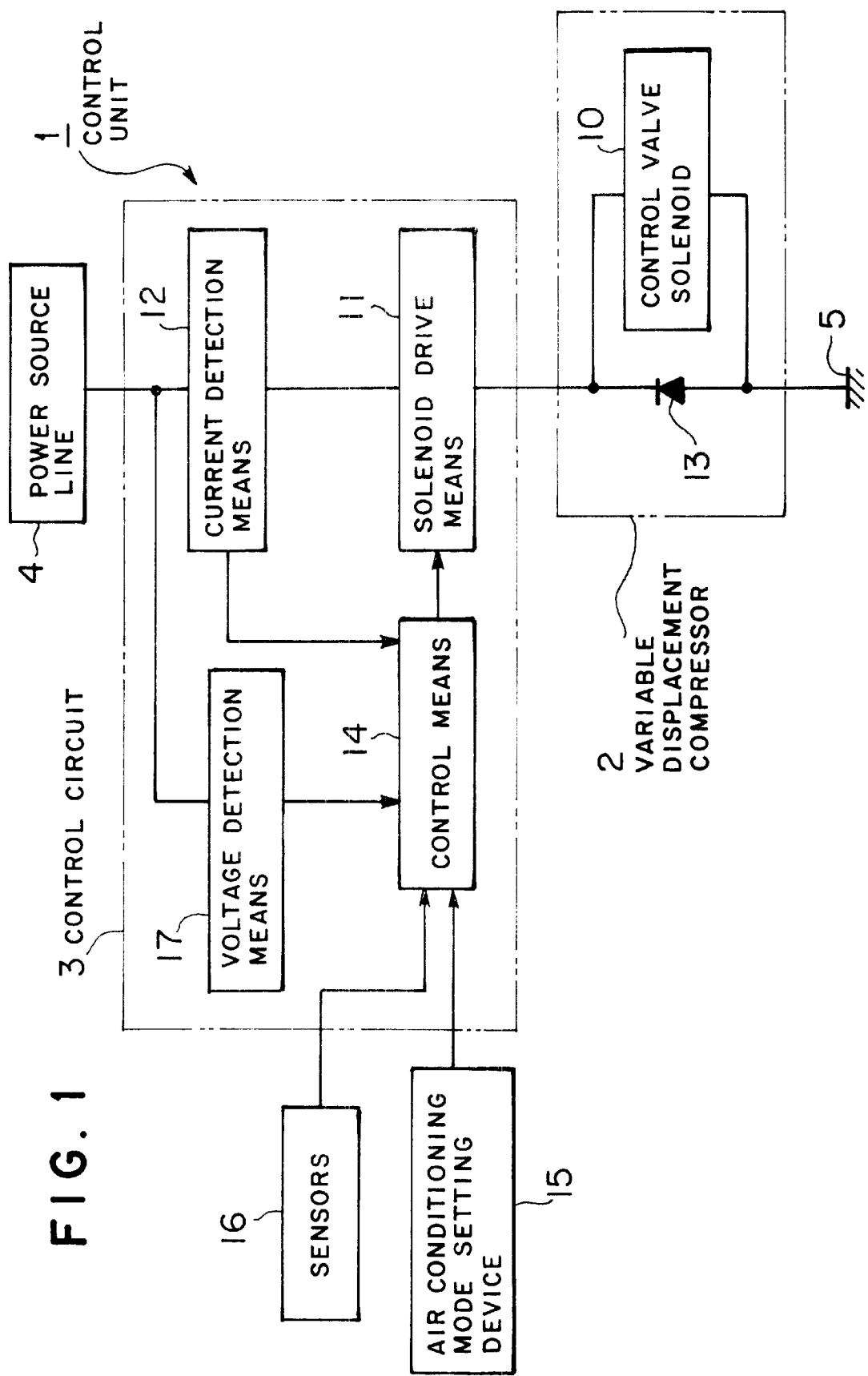
FIG. 1 is a block diagram of a control unit for a variable displacement compressor according to an embodiment of the present invention.

FIG. 1 shows a constitution of a control unit for a variable displacement compressor, according to an embodiment of the present invention. Referring to FIG. 1, a control unit 1 is depicted for a variable displacement compressor 2, and variable displacement compressor 2 is driven without use of a clutch by a rotational force transmitted from a prime mover, such as an engine for a vehicle. Control unit 1 comprises a control circuit 3 and a power source line 4.

Variable displacement compressor 2 has a control valve solenoid 10. One of the terminals of control valve solenoid 10 is connected to power source line 4 of the vehicle through solenoid drive means 11 for adjusting a current flowing in solenoid 10 and current detection means 12 for detecting a current flowing solenoid 10, and the other terminal is connected to a grounded line 5. Current detection means 12 comprises a resistor the resistance value of which is known. A diode 13 is coupled in parallel to control valve solenoid 10 to form a free wheel circuit. Solenoid drive means 11 comprises switching elements, each of which operates ON/OFF at a predetermined frequency. Solenoid drive means 11 adjusts a current flowing in control valve solenoid 10 by changing the ON/OFF ratio (duty ratio). For example, at a duty ratio of zero, the switches of solenoid drive means 11 are opened, the flow of current to control valve solenoid 10 is interrupted, and the displacement of variable displacement compressor 2 approaches a minimum. At a duty ratio of 100%, however, the switches of solenoid drive means 11 are closed, the voltage of the power source for the vehicle is directly applied to control valve solenoid 10, and the displacement of variable displacement compressor 2 approaches a maximum.

Control means 14 receives signals from an air conditioning mode-setting device 15 and signals from sensors 16 and transmits a predetermined signal (e.g., duty ratio) to solenoid drive means 11 to exercise optimum control over the compressor's displacement for discharge. The output signal of current detection means 12 and the output signal of voltage detection means 17 for detecting a voltage applied to the solenoid are input to control means 14.

Figure 2A:
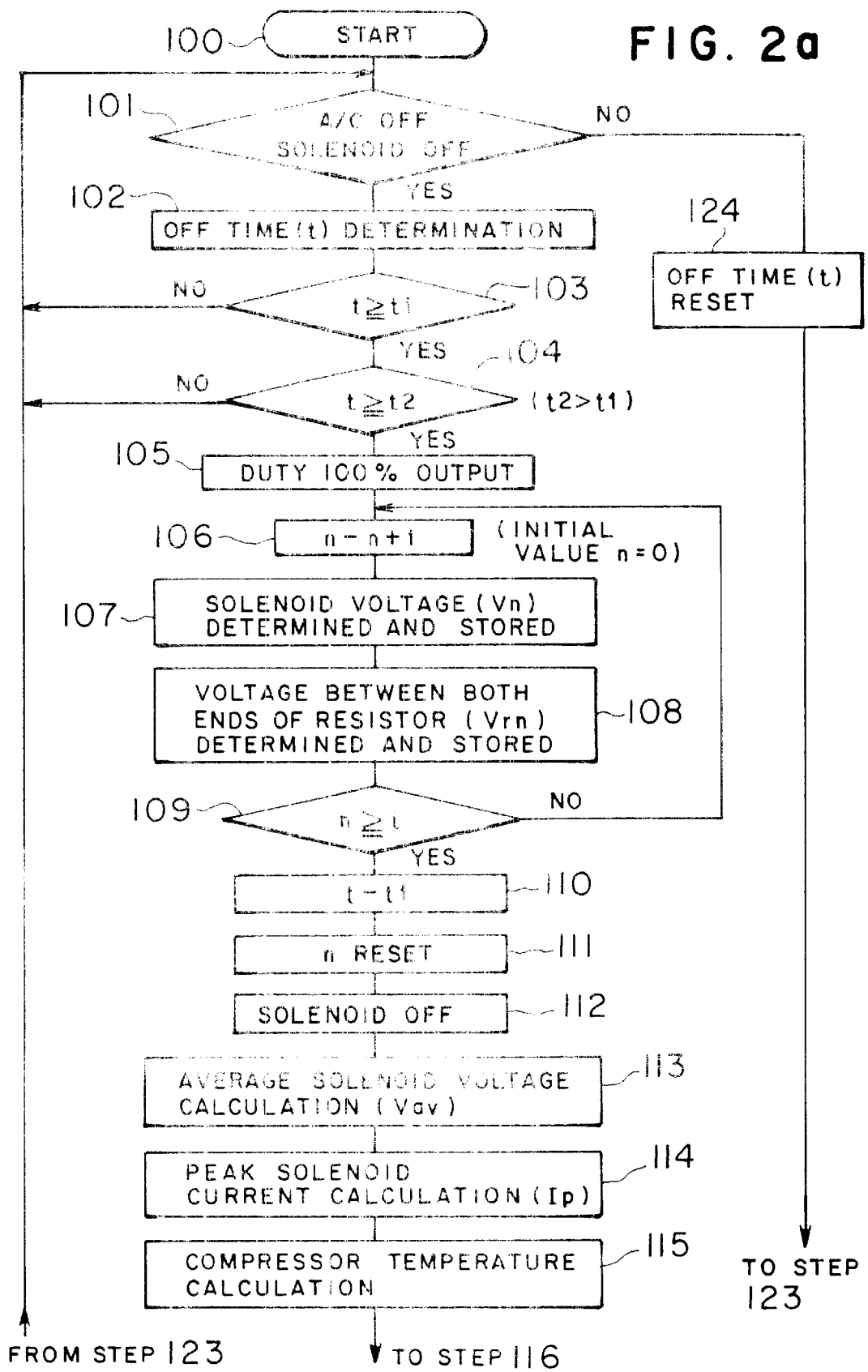
FIGS. 2a and 2b are a flowchart showing a control process for the control unit depicted in FIG. 1.
Figure 2B:
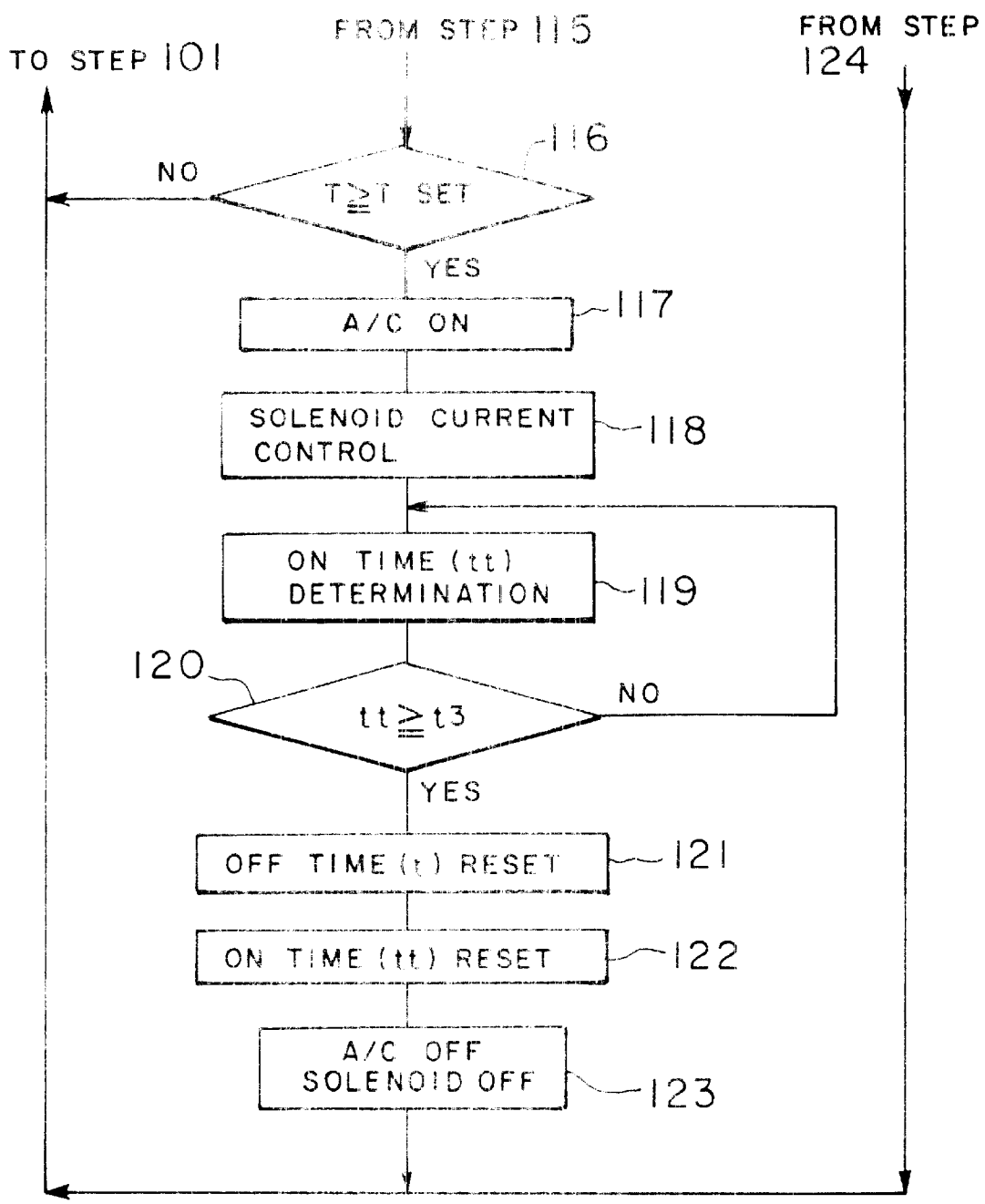

An example of the control process for the control unit for a variable displacement compressor is shown in FIGS. 2a and 2b. Referring to steps 100–104 of FIG. 2a, this portion of the process determines whether or not OFF time (t), during which the air conditioning system is not in operation, has expired relative to a predetermined time period. The process starts at step 100, and at step 101, it is confirmed that the air conditioning system is OFF and that solenoid 10 is OFF. After the OFF time (t) is determined at step 102, if t>t1 in step 103, it further is determined at step 104 whether or not a second predetermined time period (t2) has expired. The difference t1–t2 defines a time interval within which to calculate a temperature of the compressor and within which to determine whether the calculated temperature is greater than a preset value, as described below. When t≧t1 or t≧t2 are not true, the process returns to step 101.

Referring to steps 105–115 of FIG. 2a, when t>t2 at step 104, control means 14 transmits a signal for 100% duty ratio to solenoid drive means 11 at step 105. Because the switches of solenoid drive means 11 are closed and in a conducting condition, the voltage of power source line 4 is supplied directly to control valve solenoid 10. The voltage Vn at voltage detection means 17 and the voltage Vrn measured across both ends of a resistor, which is current detection means 12, are determined and stored in a memory (not shown) at steps 107 and 108. After these operations are repeated "i" between steps 106 and 109, t=t1 and n=0 are set at steps 110 and 111, control valve solenoid 10 is turned OFF at step 112, and an average solenoid voltage Vav is calculated at step 113 by averaging the voltage data of "i" iterations determined by voltage detection means 17. Thus, peak solenoid current Ip is calculated at step 114 as a value obtained by dividing the maximum value among Vr1, Vr2, . . . , Vri by a known resistance value R. Therefore, the resistance of the coil of control valve solenoid 10 may be calculated as Rs=Vav/Ip.

Figure 3:
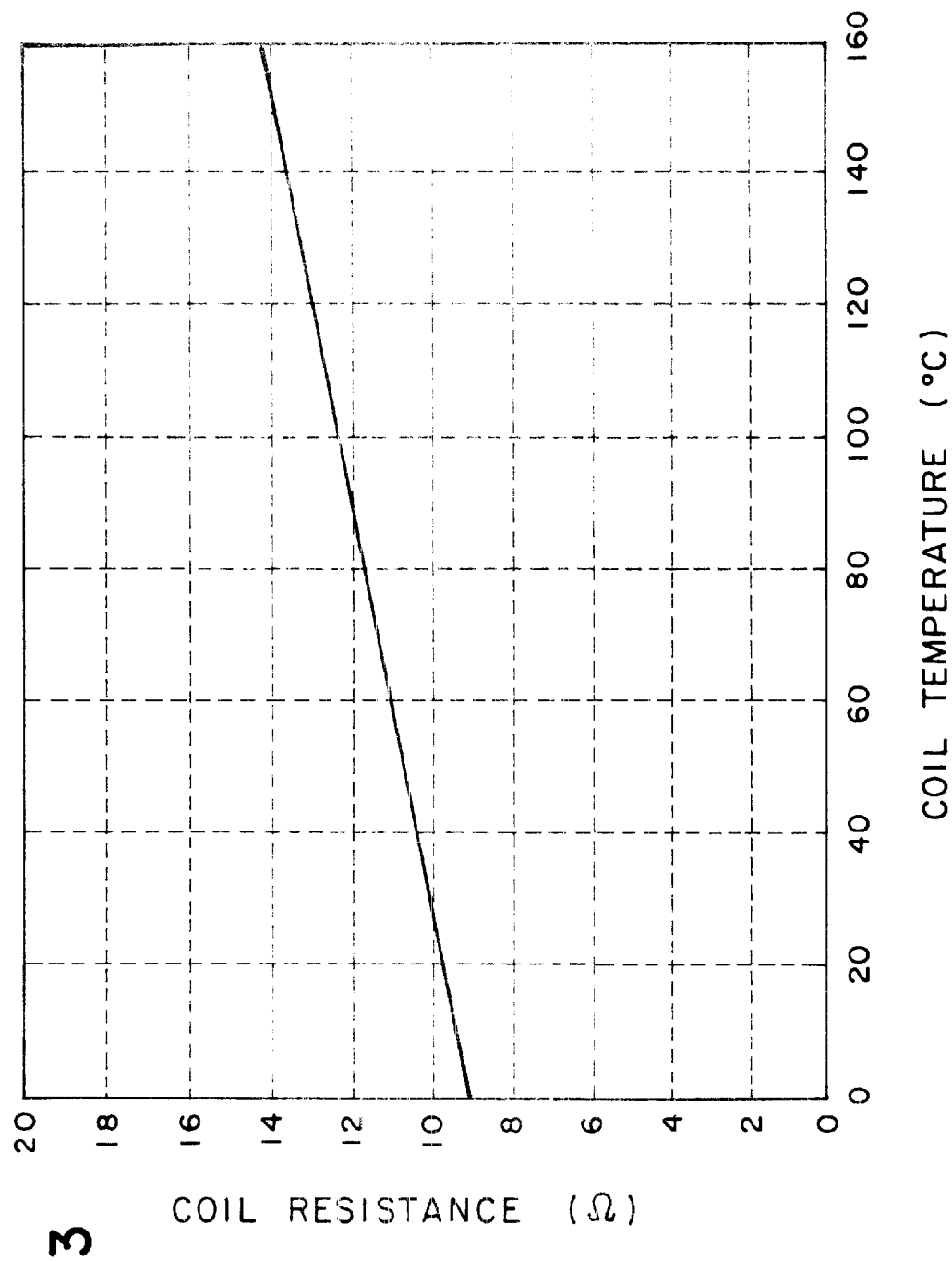
FIG. 3 is a graph showing a relationship between a temperature and a resistance of a solenoid used in the control process, as depicted in FIGS. 2a and 2b.

The relationship between the resistance value and the temperature of the coil of the solenoid is represented, for example, as shown in FIG. 3, and this relationship may be determined beforehand, and from this relationship the temperature of the solenoid is determined. Because the solenoid temperature gradually becomes the same temperature as that of the compressor if control valve solenoid 10 is not supplied with current and no voltage is applied for time t1, the temperature of the compressor is calculated as T=a·Tsol+b at step 115, where a and b are constants. Although the duration of output at 100% duty ratio is established by a determination time for "i" iterations, this determination time may be set at a time for which the discharge displacement of the compressor does not change significantly, e.g., the discharge displacement does not increase.

Referring to steps 116–123 of FIG. 2b, if it is determined that T<T set at step 116, the process returns to step 101. If it is determined, however, that T≧T set at step 116, the temperature of the compressor is determined to be an excessively high temperature, the air conditioning system begins operation at step 117, and the compressor is operated for a predetermined time period t3 by supplying a predetermined current in control valve solenoid 10 at steps 118, 119, and 120. By this operation, the refrigerant is circulated within the refrigerant circuit, thereby cooling the compressor and providing sufficient lubrication to the compressor. After the determined operation time period (tt) has expired when the predetermined time period t3 has elapsed, OFF time (t) and ON time (tt) periods are reset at steps 121 and 122, the air conditioning system is turned off (A/C OFF) and the switches of solenoid 10 are opened at step 123, and the process then returns to step 101. When the air conditioning system is shut off, OFF time period (t) is reset at step 124.

In such a control process, an increase of the temperature of the clutchless, variable displacement compressor may be detected and determined when the air conditioning system is not in operation, without providing an additional temperature sensor. Further, the construction of the control unit may be less complicated. Because the compressor is cooled and the likelihood of insufficient lubrication in the compressor is reduced or eliminated by circulating refrigerant through the compressor when the temperature of the compressor exceeds a preset value, the variable displacement compressor may be protected from temperature related damage.

Figure 4:
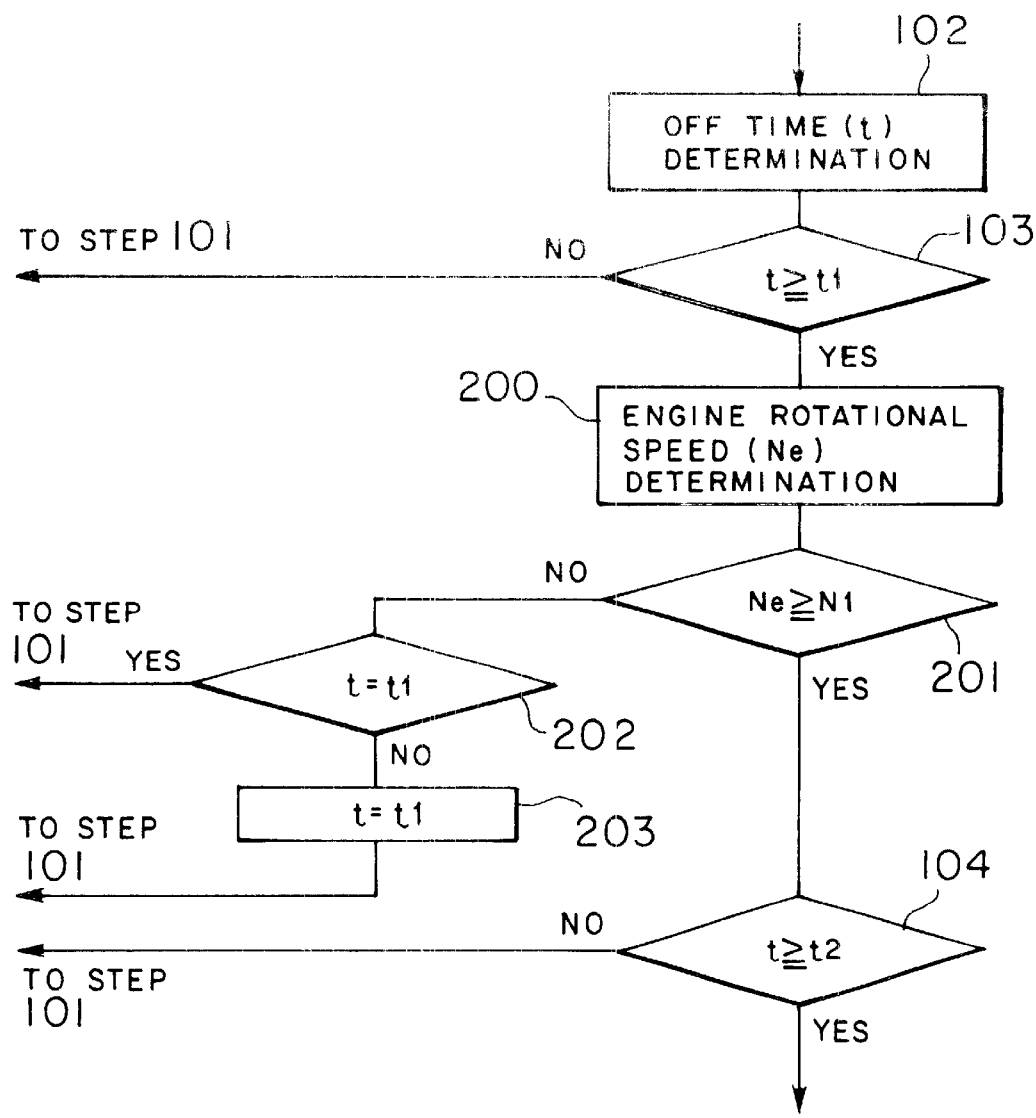
FIG. 4 is a partial flowchart showing a control process for a control unit for a variable displacement compressor, according to another embodiment of the present invention.
Figure 5:
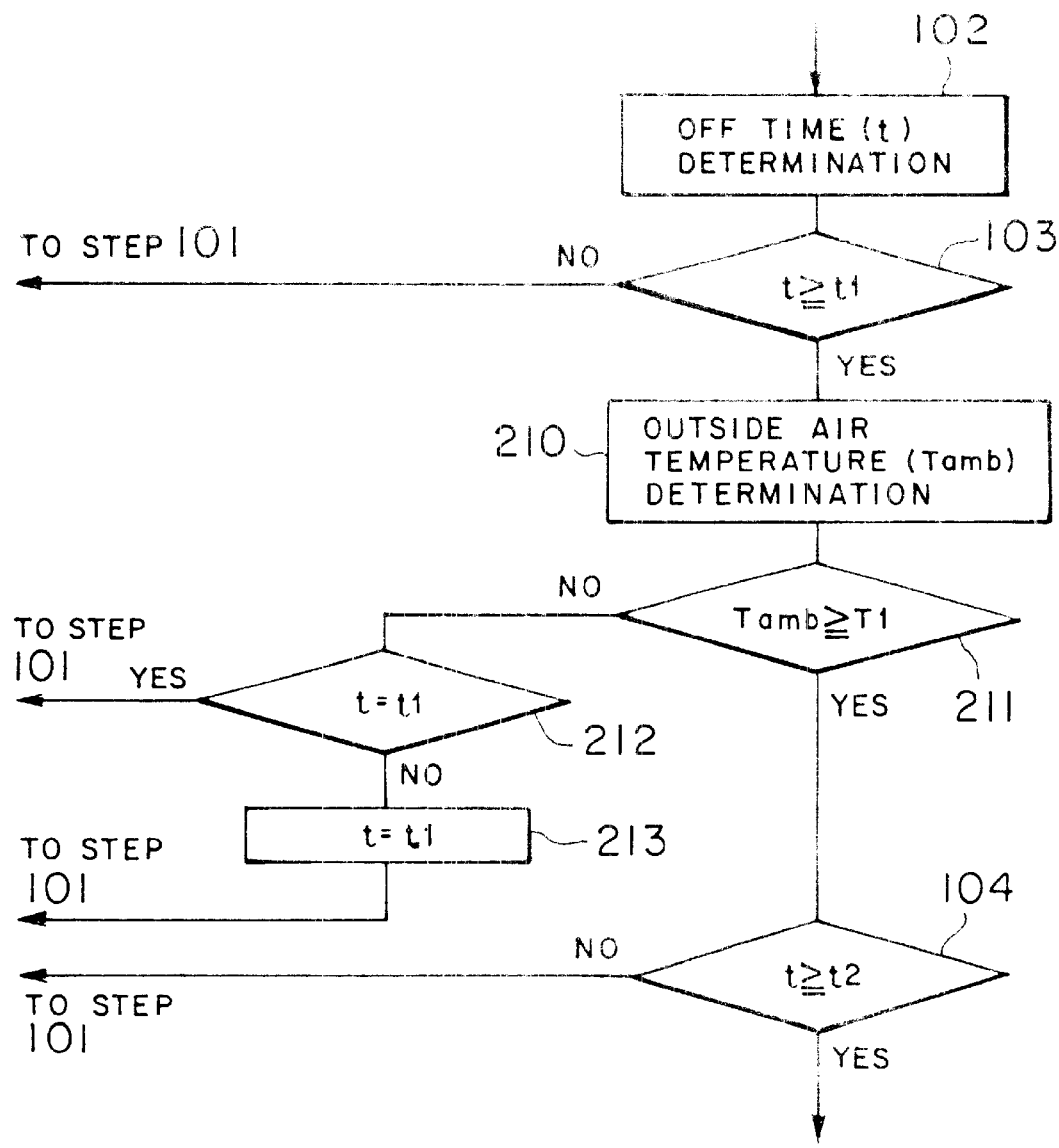
FIG. 5 is a partial flowchart showing a control process for a control unit for a variable displacement compressor, according to a further embodiment of the present invention.
Figure 6:
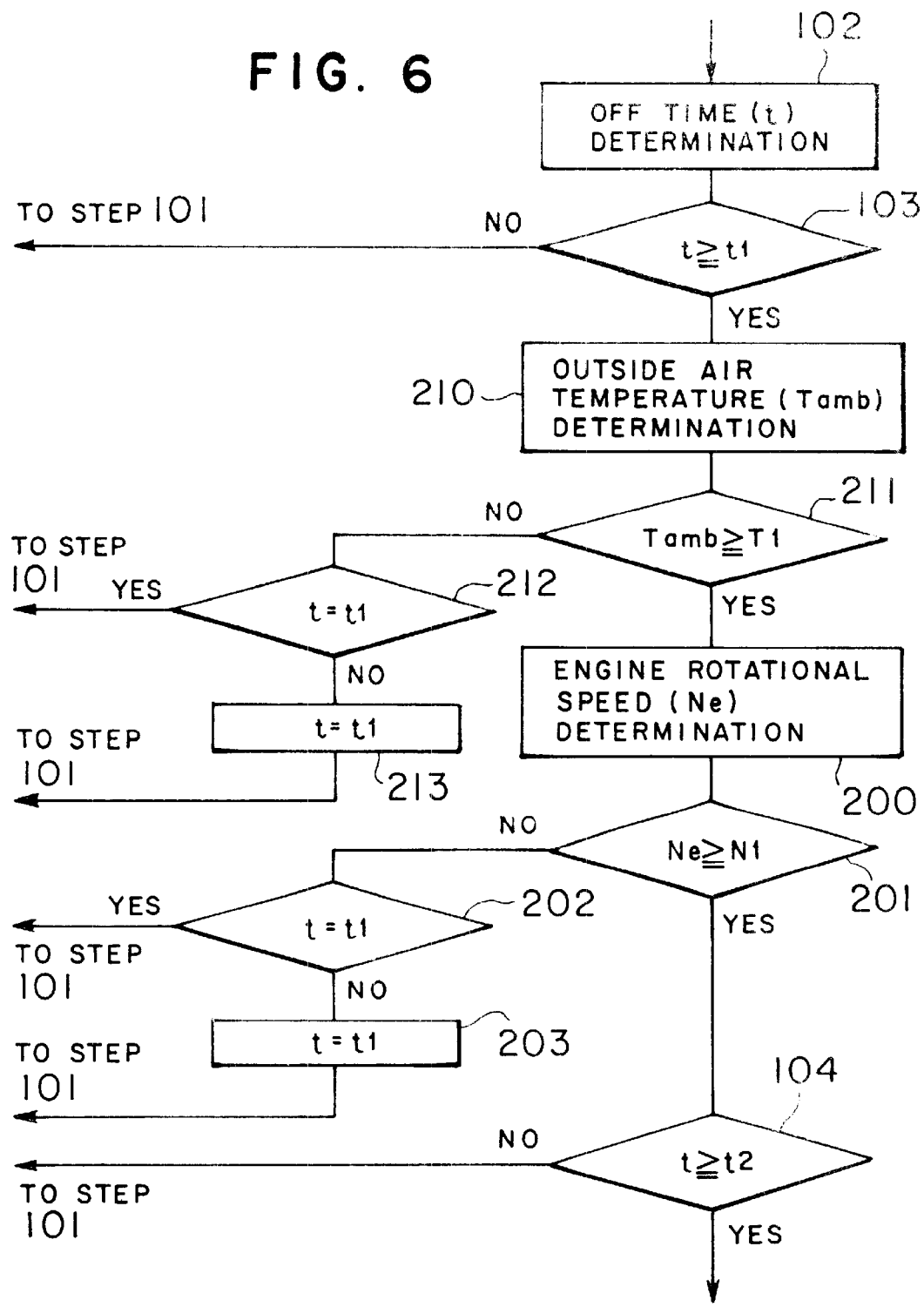
FIG. 6 is a partial flowchart showing a control process for a control unit for a variable displacement compressor, according to a still further embodiment of the present invention.

FIGS. 5 to 7 depict control processes for control units for variable displacement compressors according to other embodiments of the present invention. Although many steps in these control processes are the same as that shown in FIGS. 2a and 2b, for determining the conditions which form the basis for control of the compressor, the determination of a rotational speed of an engine (or a physical value corresponding thereto) is added to the process, as depicted in FIG. 4. Similarly, the determination of a thermal load, such as a temperature of outside air, is added to the process, as depicted in FIG. 5, and both the additional determinations of the processes of FIGS. 4 and 5 are added to the process, as depicted in FIG. 6.

Specifically, in the control process depicted in FIG. 4, the determination steps 200 and 201 for determining whether an engine rotational speed (Ne) is greater than a predetermined speed (N1) are further added between steps 103 and 104, as shown in FIG. 2a. When this condition of step 201 is not satisfied, however, the process returns to step 101 via steps 202 and 203.

In the control process depicted in FIG. 5, the determination steps 210 and 211 for determining whether an outside air temperature (Tamb) is greater than a predetermined temperature (T1) are added between steps 103 and 104, as shown in FIG. 2a. When this condition of step 211 is not satisfied, the process returns to step 101 via steps 212 and 213.

In the control process depicted in FIG. 6, the above-described determination steps 210 and 211 for determining whether an outside air temperature (Tamb) is greater than a predetermined temperature (T1) and the above-described determination steps 200 and 201 for determining whether an engine rotational speed (Ne) is greater than a predetermined speed (N1), both are added between steps 103 and 104, as shown in FIG. 2a. Thus, by adding determination conditions, such as an engine rotational speed or an outside air temperature, or both, the temperature of the compressor may be controlled more properly and more accurately.

Although embodiments of the present invention have been described in detail herein, the scope of the invention is not limited thereto. It will be understood by those skilled in the art that modifications may be made without departing from the scope of the invention. Accordingly, the embodiments disclosed herein are merely exemplary. It is to be understood that the scope of the invention is not to be limited thereby, but is to be determined by the claims which follow.

What is claimed is:

1. A control unit for a clutchless, variable displacement compressor used in air conditioning systems for vehicles, said compressor having a solenoid, such that discharge displacement of said compressor is controlled by adjusting a pressure in said compressor by a control valve operated by controlling a current flowing in said solenoid, said control unit comprising:

solenoid drive means comprising switching elements for adjusting said current flowing in said solenoid;

voltage detection means for detecting a voltage applied to said solenoid;

current detection means for detecting said current flowing in said solenoid; and control means for delivering current to said solenoid drive means for a first predetermined time period when said air conditioning system for vehicles is not operating and after said solenoid has been isolated from flowing current for a second predetermined time; for calculating a resistance of a coil of said solenoid from a voltage detected by said voltage detection means and a current detected by said current detection means; for calculating a temperature of said compressor from said calculated resistance based on a predetermined relationship between said calculated resistance and a temperature of said coil of said solenoid; and for operating said variable displacement compressor by supplying current to said solenoid when said calculated temperature exceeds a set value.

2. The control unit according to claim 1, further comprising rotational speed detection means for detecting a physical value corresponding to a rotational speed of said compressor, wherein said control means controls supply of current to said solenoid drive means during said first predetermined time period when said air conditioning system for vehicles is not in operation and after current has been prevented from flowing to said solenoid during said second predetermined time period, and an output value of said rotational speed detection means exceeds a predetermined value continuously during a third predetermined time, whereby a resistance of a coil of said solenoid is calculated based on a voltage detected by said voltage detection means and a current detected by said current detection means and a temperature of said compressor is calculated from said calculated resistance based on said predetermined relationship between the resistance and a temperature of said coil of said solenoid, and said variable displacement compressor is operated by supplying current to said solenoid when said calculated temperature exceeds said set value.

3. The control unit according to claim 1, further comprising thermal load detection means for detecting a thermal load, wherein said control means controls delivery of current to said solenoid drive means during said first predetermined time period when said air conditioning system for vehicles is not in operation, and after current has been prevented from flowing to said solenoid during said second predetermined time period, and an output value of said thermal load detection means exceeds a predetermined value continuously during a fourth predetermined time, whereby a resistance of a coil of said solenoid is calculated based on a voltage detected by said voltage detection means and a current detected by said current detection means, and a temperature of said compressor is calculated from said calculated resistance based on said predetermined relationship between the resistance and a temperature of said coil of said solenoid, and said variable displacement compressor is operated by supplying current to said solenoid when said calculated temperature exceeds said set value.

4. The control unit according to claim 1 further, comprising thermal load detection means for detecting a thermal load and rotational speed detection means for detecting a physical value corresponding to a rotational speed of said compressor, wherein said control means controls supply of current to said solenoid drive means during said first predetermined time period when said air conditioning system for vehicles is not in operation, and after current has been prevented from flowing to said solenoid during said second predetermined time period, and output values of each of said thermal load detection means and said rotational speed detection means exceed respective predetermined values continuously during a fifth predetermined time period, whereby a resistance of a coil of said solenoid is calculated based on a voltage detected by said voltage detection means and a current detected by said current detection means are calculated, a temperature of said compressor is calculated from said calculated resistance based on said predetermined relationship between the resistance and a temperature of said coil of said solenoid, and said variable displacement compressor is operated by supplying flowing current to said solenoid when said calculated temperature exceeds said set value.

5. The control unit according to claim 1, wherein said control means returns said air conditioning system for vehicles to a non-operating condition after a sixth predetermined time period and after said air conditioning system for vehicles has been operated.

6. The control unit according to claim 2, wherein said control means returns said air conditioning system for vehicles to a non-operating condition after a sixth predetermined time period and after said air conditioning system for vehicles has been operated.

7. The control unit according to claim 3, wherein said control means returns said air conditioning system for vehicles to a non-operating condition after a sixth predetermined time period and after said air conditioning system for vehicles has been operated.

8. The control unit according to claim 4, wherein said control means returns said air conditioning system for vehicles to a non-operating condition after a sixth predetermined time period and after said air conditioning system for vehicles has been operated.

* * * * *